United States Patent [19]

Sung

[11] Patent Number: 5,240,482
[45] Date of Patent: Aug. 31, 1993

[54] SHOWER TUNNEL-TYPE SCRUBBING APPARATUS FOR PURIFYING EFFLUENT GASES

[76] Inventor: Lee D. Sung, Rm A-106, Hanshin Apartment, #258 NonHyun-Dong, Kangnam-Ku, Seoul, Rep. of Korea

[21] Appl. No.: 888,744

[22] Filed: May 22, 1992

[30] Foreign Application Priority Data

Apr. 14, 1992 [KR] Rep. of Korea .................. 92-6214

[51] Int. Cl.⁵ ............................................. B01F 3/04
[52] U.S. Cl. ............................... 55/228; 55/229; 55/257.5; 261/116; 261/22
[58] Field of Search ............... 55/228, 229, 257.5; 261/116, 22

[56] References Cited

U.S. PATENT DOCUMENTS

| | | | |
|---|---|---|---|
| 1,291,840 | 1/1919 | Gran | 261/116 |
| 1,563,125 | 11/1925 | Ward | 261/116 |
| 1,878,582 | 9/1932 | Hellmer | 261/116 |
| 2,090,466 | 8/1937 | Bichowsky | 55/228 |
| 3,372,530 | 3/1968 | Zimmer | 261/116 |
| 3,797,204 | 3/1974 | Cavatassi | 55/228 |
| 4,219,342 | 8/1980 | Workman | 55/228 |
| 4,364,750 | 12/1982 | Konez | 55/228 |
| 4,374,813 | 2/1983 | Chen et al. | 55/228 |
| 4,583,999 | 4/1986 | Lindahl et al. | 55/228 |
| 4,645,652 | 2/1987 | Kimura | 423/235 |
| 4,690,697 | 9/1987 | Schwartz et al. | 55/84 |
| 4,734,108 | 3/1988 | Cox et al. | 55/84 |
| 4,943,306 | 7/1990 | Cho | 55/228 |

*Primary Examiner*—Tim Miles
*Attorney, Agent, or Firm*—Vidas, Arrett, & Steinkraus

[57] ABSTRACT

A shower tunnel-type scrubbing apparatus for purifying effluent gases produced in buildings or industrial facilities comprises the first cylindical exhaust pipe, ring-like branch pipes, nozzle holes, nozzles, a distribution pipe, a supply pipe, the second exhaust pipe including baffles and a counteragent inlet, a discharging duct and a reservoir, and provides a superior ability in exhausting and purifying effluent gases without requiring a forced exhaust and without having any difficulties in the process of exhaust.

8 Claims, 4 Drawing Sheets

SHOWER TUNNEL-TYPE SCRUBBING APPARATUS FOR PURIFYING EFFLUENT GASES

BACKGROUND OF THE INVENTION

1. Field of the Invention

The present invention relates generally to a scrubbing apparatus for purifying effluent gas and, more particularly, to a shower tunnel-type scrubbing apparatus for purifying effluent gas produced in buildings, industrial facilities, and the like, which provides a superior ability in exhausting and purifying effluent gases, without requiring a forced exhaust and without having any difficulties in the process of exhaust.

2. Description of the Prior Art

A scrubbing apparatus is classified into two groups, one is dry scrubbers utilizing a filter trap, a catalyst, an electrostatic precipitator and the like, the other is wet scrubbers with effluent gases passing through an artificial rain tunnel such as a cooling tower.

The dry scrubber, however, has a short life as well as a limitation of purification capacity.

In case of utilizing the electrostatic precipitator, high costs of establishment are required. On the other hand, the wet scrubbers require a forced exhaust due to the difficulties in exhaust which disturb exhaust. In case of a forced exhaust, there exists a limitation in length of the artificial rain tunnel so that the purification capacity is forced to be limited.

SUMMARY OF THE INVENTION

It is the principal object of the present invention to provide a shower tunnel-type scrubbing apparatus which enable effluent gases to be completely purified with relatively low costs in establishment and maintenance, and a long life while avoiding disadvantages of the conventional scrubbing apparatus.

In order to achieve the object of the present invention, the invention resides in a shower tunnel-type scrubbing apparatus for purifying effluent gases comprising: the first cylindrical exhaust pipe having an inlet and an outlet for introducing effluent gases being purified and for discharging purified gases to the atmosphere; a plurality of ring-like branch pipes equidistantly mounted on the inner peripherals of said first cylindrical exhaust pipe; a plurality of nozzle holes perforated on the circumference of said branch pipes; a plurality of nozzles threadedly engaged with said nozzle holes so as to concentrically spray water toward the center of said first exhaust pipe; a distribution pipe connected to each of said branch pipes to distribute water; a supply pipe connected to said distribution pipe to supply water passed through a drain pipe, a water tank and a pump; the second cylindrical exhaust pipe connected to and having generally same constitution as said first exhaust pipe, and including, baffles preventing the water in said first exhaust pipe from being forwarded to said second exhaust pipe and allowing the gases to be forwarded to said second exhaust pipe, and a counteragent inlet for introducing a counteragent into said water tank of said second exhaust pipe; a discharging duct vertically mounted to the rear end of said second exhaust pipe to discharge purified gases; and a reservoir mounted under said discharging duct at the rear end of said second exhaust pipe to drain used water to said water tank via a drain pipe.

In another embodiment, the branch pipes can be uprightly mounted in uniform spaces and include bent front ends on the center portion of the first and second exhaust pipes. Recessed baffles are attached to each of the branch pipes opposite to the nozzles. Water is divergingly sprayed by diffusion spray nozzles against the inner wall of the exhaust pipes.

The discharging duct can be formed horizontally. A subsidiary drain pipe can be positioned near the drain pipe depending on the length of the exhaust pipes. A filter can be mounted between the water tank and the pump so as to purify circulating water.

BRIEF DESCRIPTION OF THE DRAWINGS

The invention will become more readily apparent from the following description of the first and the second preferred embodiments thereof, shown by way of example only, in the accompanying drawings wherein.

DETAILED DESCRIPTION OF THE INVENTION

Figure 1:
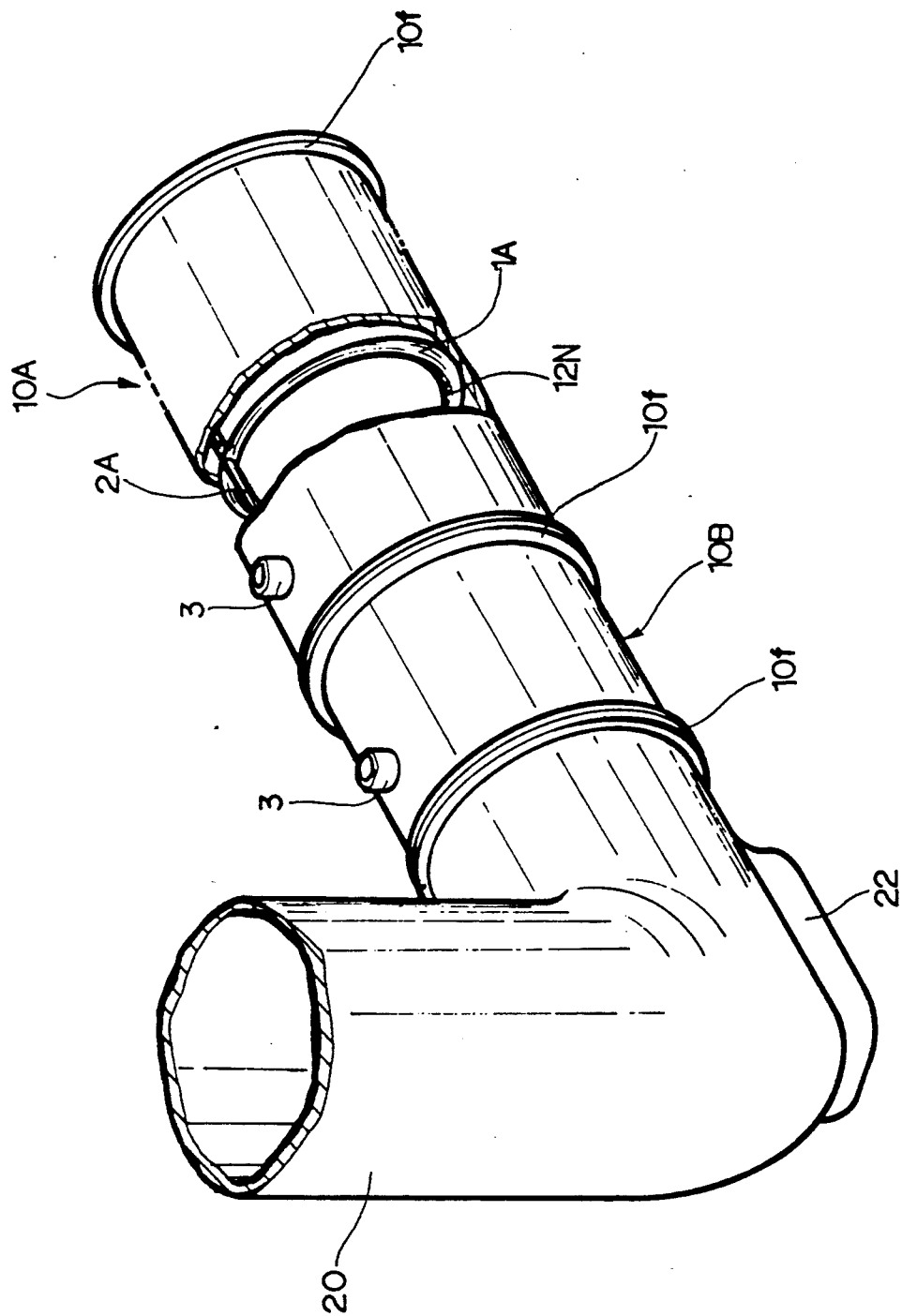
FIG. 1 is a perspective view of a shower tunnel-type scrubbing apparatus of the present invention with parts broken away for clarity.
Figure 2:
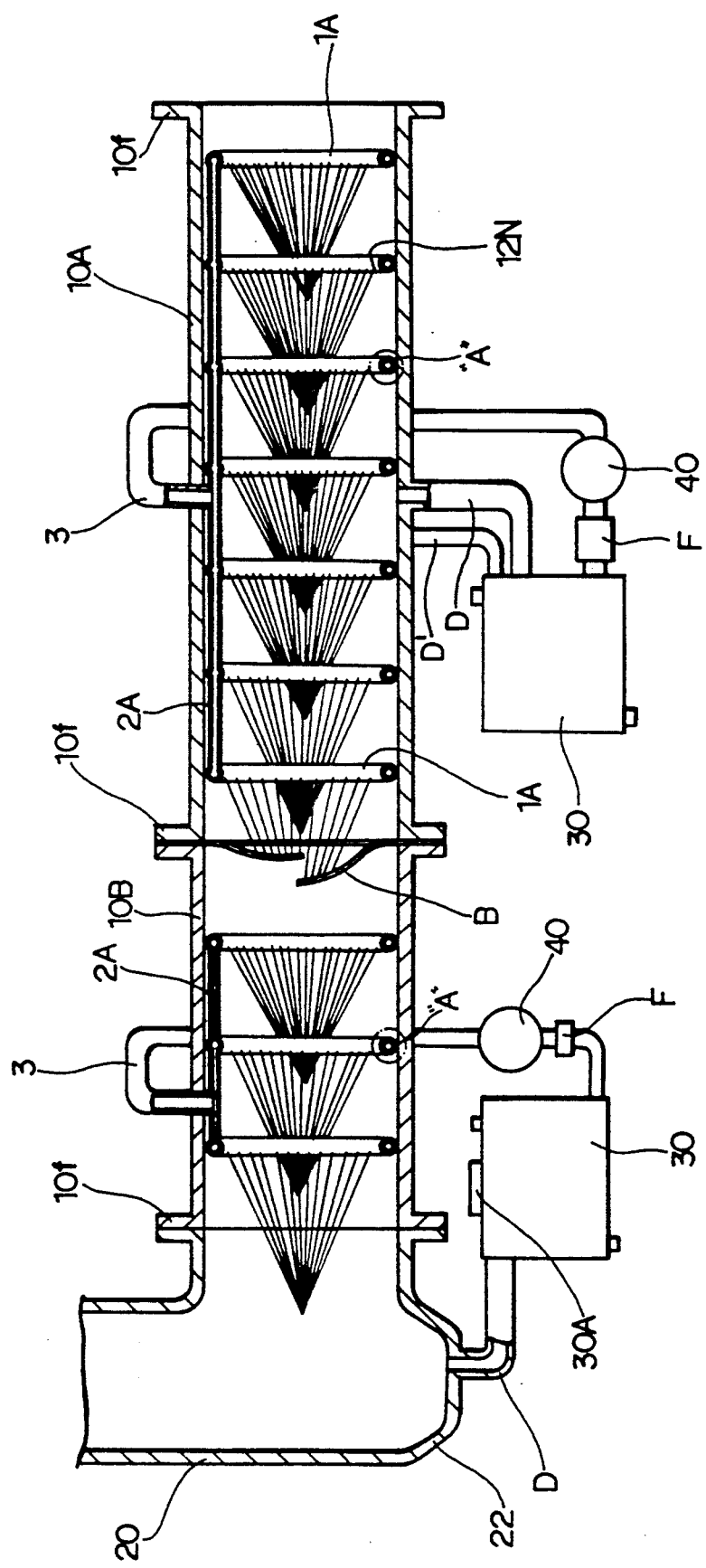
FIG. 2 is a cross-sectional view of the shower tunnel-type scrubbing apparatus of the present invention shown in FIG. 1.

FIG. 1 illustrates a shower tunnel-type scrubbing apparatus according to an embodiment of the present invention and FIG. 2 is a cross-sectional view of the apparatus of FIG. 1 for explaining the operation thereof. The scrubbing apparatus generally includes the first exhaust pipe 10A, the second exhaust pipe 10B, and a discharging duct 20. A plurality of ring-like branch pipes 1A are equidistantly mounted on the inner peripherals of the first cylindrical exhaust pipe 10A.

Figure 3:
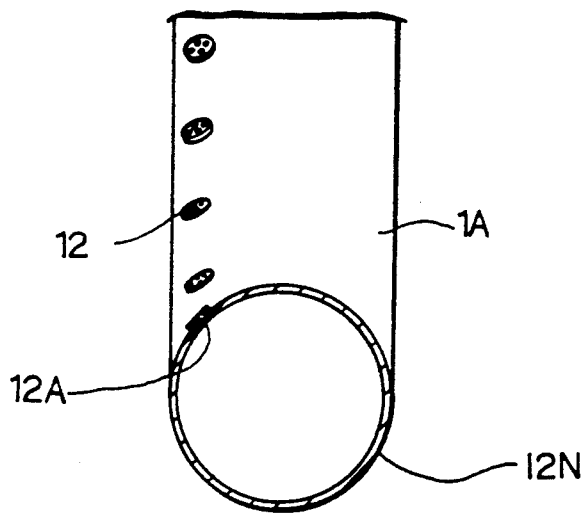
FIG. 3 is an enlarged view of the portion "A" of FIG. 2.

It should be understood that the number of the branch pipes 1A and the length of the first exhaust pipe 10A are not limited on the apparatus according to the invention. The branch pipes 1A mounted on the inner peripherals of the first exhaust pipe 10A include a plurality of nozzle holes 12A which are perforated on the circumference of the branch pipes 1A to be threaded with nozzles 12N(see FIGS. 1 and 3) so that the angle of the shower spray is concentrated on the center of the first cylindrical exhaust pipe 10A.

Each of the branch pipes 1A is connected in parallel to a distribution pipe 2A at one side thereof. A supply pipe 3 is penetratively positioned on the generally center portion of the first exhaust pipe 10A. Water is supplied from the supply pipe 3 to the distribution pipe 2A and then branch pipes 1A, concentrically sprayed by the nozzles 12N, and returned to the pump 40 via a drain pipe D mounted on the bottom of the first exhaust pipe 10A, a water tank 30 and a filter F.

Each of the two flanges 10f is formed on front and rear ends of the exhaust pipe 10A so as to connect an introducing duct (not shown) and the second exhaust pipe 10B of the effluent gases. The second exhaust pipe 10B is mounted between the first exhaust pipe 10A and the discharging duct 20. The constitution of the second exhaust pipe 10B is generally similar to that of the first exhaust pipe 10A so that the description of the like portion would be omitted. It should be noted, however, that the second exhaust pipe 10B includes baffles B mounted between the first and second exhaust pipes 10A and 10B, and the water tank 30 of the second exhaust pipe 10B includes a counteragent inlet 30A. The discharging duct 20 may be formed vertically or horizontally. A subsided reservoir 22 is formed on the lower portion of the discharging duct 20 so as to be connected to a water tank 30 via a drain pipe D. And then, water is circulated via a filter F, a pump 40, the supply pipe 3, the distribution pipe 2A, and the ring-like branch pipes 1A and concentrically sprayed by the nozzles 12N.

The baffles B prevent the water in the first exhaust pipe 10A from being forwarded to the second exhaust pipe 10B, and allow the gases passing through the first exhaust pipe 10A to be forwarded to the second exhaust pipe 10B. The counteragent inlet 30A make it possible to introduce a counteragent into the tank 30 of the second exhaust pipe 10B depending on the degree of toxicity of the effluent gases.

In case of the long exhaust pipe 10A, a subsidiary drain pipe D' may be formed near the drain pipe D in the lower portion of the exhaust pipe 10 so as to accelerate drainage. Where water is acidified by repeatedly using, the period of using can be extended by adding alkaline counteragent. The acidified water can be refreshed as distilled water by producing vapour with a vacuum concentration device and turning to liquid with a condenser. Where there exist toxic components not easily dissolved in water such as nitrogen oxides(NOx), it is possible to completely purify the effluent gases by introducing counteragents such as ammonia counteragent, etc. into the tank 30 of the second exhaust pipe 10B through the inlet 30A.

The operation of the scrubbing apparatus according to the invention will now be described hereinafter.

While the noxious effluent gases from the building or the industrial facilities are introduced into the first exhaust pipe 10A, the pump 40 enables the water in the tank 30 to be highly pressurized, pass through and be purified by the filter F. The high pressure water is fed through the pipe line to the supply pipe 3, the distribution pipe 2A, and the branch pipes 1A, and then concentrically sprayed by a plurality of nozzles 12N toward the center of the first exhaust pipe 10A with constant pressure and speed.

Simultaneously, the effluent gases introduced in the first exhaust pipe 10A are also concentrated toward the center of the first exhaust pipe 10A along with the sprayed water. The sprayed water from each of the nozzle forms a shower curtain. While the sprayed water is concentrated on the center of the exhaust pipe 10, the noxious components contained in the effluent gases in the state of gases or particulates are dissolved in water. Although there are multiple shower curtains, the exhaust is not disturbed but promoted since the effluent gases rapidly pass through the shower tunnel with the velocity proportioned to that of the water spray. Although the shower tunnel is very long, the exhaust is not disturbed thanks to the rapid spray of water.

As noted above with the baffles B, the water in the first exhaust pipe 10A drains to the tank 30 through the drain pipe D, and the gases flow into the second exhaust pipe 10B through the baffles B. The water mixed with counteragents in the second exhaust pipe 10B neutralize the noxious components by the characteristic of counteragents.

The circulation of water in the second exhaust pipe 10B is similar to that in the first exhaust pipe 10A, excepting the counteragent inlet 30A so as to introduce necessary counteragents depending on the kinds of the main components of the effluent gases if required.

The reasons that the length of the second exhaust pipe 10B is shorter than that of the first exhaust pipe 10A and the second exhaust pipe 10B has a separate water circulation line are to spare the amount of counteragents to be introduced and to improve the capacity of neutralization.

The operation of the other embodiment of the invention will now be described in which description of the same or like portions as one embodiment described hereinbefore are omitted.

Figure 5:
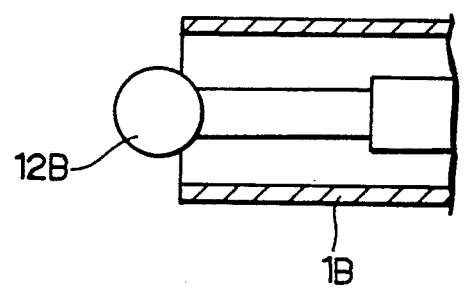
FIG. 5 is an enlarged sectional view of the portion "B" of FIG. 4.
Figure 4:
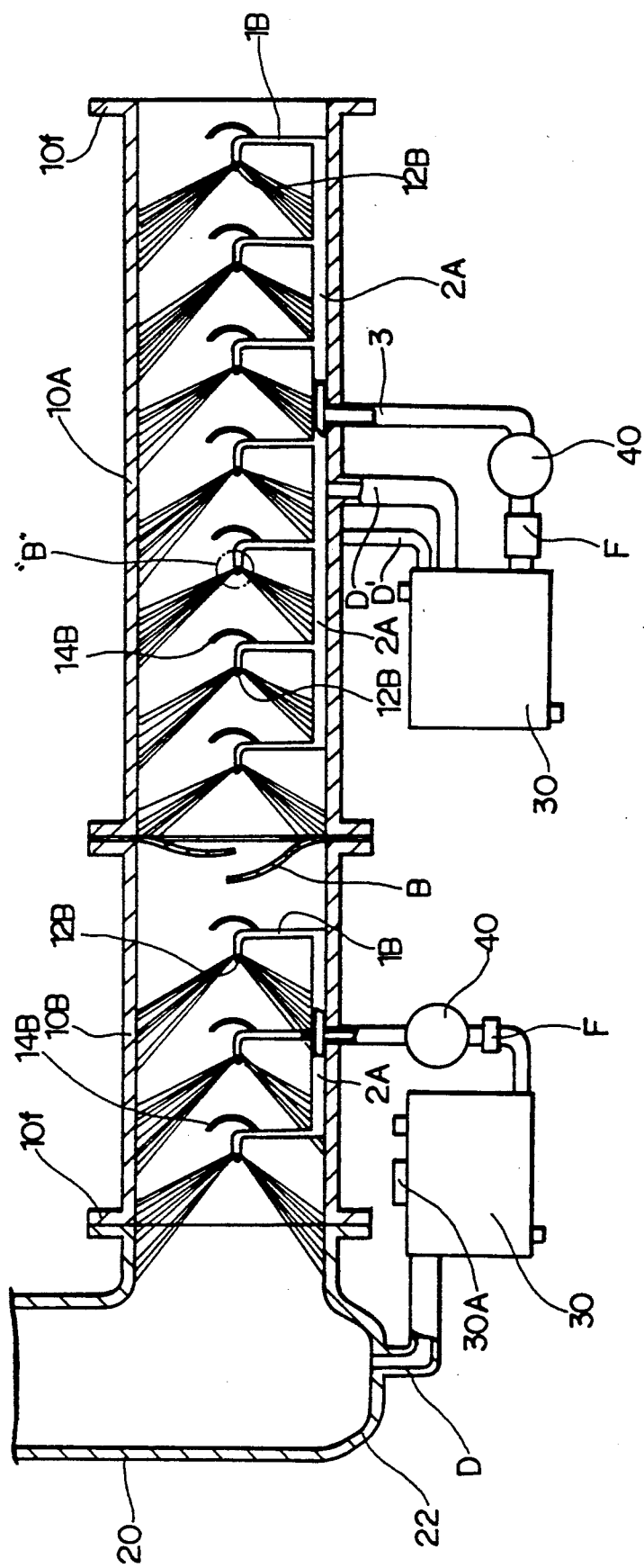
FIG. 4 is a cross-sectional view showing an alternate embodiment of the apparatus of FIG. 1.

As shown in FIG. 4 and FIG. 5, the characters of the other embodiment of the invention are that the branch pipes 1B including bent from ends are uprightly mounted in uniform spaces on the center portion of the first and the second exhaust pipes 10A and 10B, water is divergingly sprayed by diffusion spray nozzles 12B against the inner wall of the first and the second exhaust pipes 10A and 10B, and recessed baffles 14B are attached to each branch pipes opposite to the nozzles 12B. Water is fed to the branch pipes 1B via the supply pipe 3 and the distribution pipe 2B.

In the diffusion shower tunnel-type scrubbing apparatus described hereinbefore, the nozzles 12B are mounted on the front ends of the branch pipes 1B and also on the center portion of the first and the second exhaust pipes 10A and 10B so that water is divergingly sprayed against the inner wall of the first and the second exhaust pipes 10A and 10B, simultaneously, the effluent gases introduced in the first and the second exhaust pipes 10A and 10B are diverged together with divergingly sprayed water by the diffusion nozzles 12B against the inner wall of the first and the second exhaust pipes 10A and 10B so that the effluent gases as well as water flow along the inner wall of the exhaust pipe 10.

Although there is a tendancy that the velocity of the effluent gases in diffusion shower spray becomes slower than that in concentration shower spray, it should be noted that more effective purification can be achieved due to the long residence time of the effluent gases in the shower tunnel and the uniform distribution of gases. Accordingly, it is suitable for the scrubbing apparatus in diffusion shower spray to use in the place requiring constant purification of noxious components such as tunnels, subways, underground spaces, or poisonous gas exhaust site, where the perfect combustion burner device is not needed.

As described above, the shower tunnel-type scrubbing apparatus of the invention makes it possible to promote exhausts of noxious gases with or without having velocity themselves from buildings or industrial facilities, dissolve noxious components of the effluent gases in water during passing through the shower curtain formed in the shower tunnel, avoid serious air pollution from industrialization by effective exhaust and purification without requiring to drive a separate fan for a forced exhaust.

Although only preferred embodiments are specifically illustrated and described herein, it will be appreciated that many modifications and variations of the present invention are possible in the light of the above teachings and within the purview of the appended claims without departing from the spirit and intended scope of the invention.

For instance, the first and the second exhaust pipes 10A and 10B of the invention are not restricted to a cylindrical shape, they may be rectangular or any other angular bodies. Also the water spray nozzle may be a spiral arrangement if required.

What is claimed is:

1. A shower tunnel-type scrubbing apparatus for purifying effluent gases comprising:

a first cylindrical exhaust pipe having an inlet and an outlet for introducing effluent gases being purified and for discharging purified gases to the atmosphere;

a plurality of ring-like branch pipes equidistantly mounted on the inner peripherals of said first cylindrical exhaust pipe;

a plurality of nozzle holes perforated on the circumference of said branch pipes;

a plurality of nozzles threadedly engaged with said nozzles holes so as to concentrically spray water toward the center of said first exhaust pipe;

a distribution pipe connected to each of said branch pipes to distribute water;

a supply pipe connected to said distribution pipe to supply water;

a first drain pipe connected to the first cylindrical exhaust pipe;

a first water tank connected to the drain pipe of the first cylindrical exhaust pipe;

a pump connected to the first water tank for supplying water to the supply pipe;

a second cylindrical exhaust pipe connected to and having generally the same constitution as said first exhaust pipe, and including;

baffles preventing the water in said first exhaust pipe from being forwarded to said second exhaust pipe and allowing the gases to be forwarded to said second exhaust pipe, and a second water tank connected to a pump for supplying water to the supply pipe of the second cylindrical exhaust pipe;

a counteragent inlet for introducing a counteragent into said second water tank of said second exhaust pipe;

a discharging duct vertically mounted to the rear end of said second exhaust pipe to discharge purified gases; and a reservoir mounted under said discharging duct at the rear end of said second exhaust pipe to drain used water to said second water tank via a second drain pipe.

2. The scrubbing apparatus as claimed in claim 1, wherein said discharging duct is formed horizontally.

3. The scrubbing apparatus as claimed in claim 1, further including a subsidiary drain pipe positioned near said first drain pipe.

4. The scrubbing apparatus as claimed in claim 1, further including a filter between said water tank and said pump so as to purify circulating water.

5. A shower tunnel-type scrubbing apparatus for purifying effluent gases comprising:

a first cylindrical exhaust pipe having an inlet and an outlet for introducing effluent gases being purified and for discharging purified gases to the atmosphere;

a plurality of branch pipes uprightly and equidistantly mounted and which include bent front ends on the center portion of said first cylindrical exhaust pipe,;

a plurality of nozzle holes perforated on the bent front ends of said branch pipes;

a plurality of diffusion nozzles threadedly engaged with said nozzle holes so as to divergingly spray water toward the inner wall of said first exhaust pipe;

a recessed baffle attached to each of said branch pipes opposite to the nozzles;

a distribution pipe connected to each of said branch pipes to distribute water;

a supply pipe connected to said distribution pipe to supply water;

a first drain pipe connected to the first cylindrical exhaust pipe;

a first water tank connected to the drain pipe of the first cylindrical exhaust pipe;

a pump connected to the first water tank for supplying water to the supply pipe;

a second cylindrical exhaust pipe connected to and having generally the same constitution as said first exhaust pipe, and including;

baffles preventing the water in said first exhaust pipe from being forwarded to said second exhaust pipe and allowing the gases to be forwarded to said second exhaust pipe, and a second water tank connected to a pump for supplying water to the supply pipe of the second cylindrical exhaust pipe;

a counteragent inlet for introducing a counteragent into said second water tank of said second exhaust pipe;

a discharging duct vertically mounted to the rear end of said second exhaust pipe to discharge purified gases; and a reservoir mounted under said discharging duct at the rear end of said second exhaust pipe to drain used water to said second water tank via a second drain pipe.

6. The scrubbing apparatus as claimed in claim 5 wherein said discharging duct is formed horizontally.

7. The scrubbing apparatus as claimed in claim 5, further including a subsidiary drain pipe positioned near said first drain pipe.

8. The scrubbing apparatus as claimed in claim 5, further including a filter between said water tank and said pump so as to purify circulating water.

* * * * *